Dec. 24, 1963   J. R. SCHNEIDER   3,115,139
TEETHING DEVICE
Filed April 11, 1962

INVENTOR.
JOHN R. SCHNEIDER.
BY
Christy, Parmelee, & Strickland
ATTORNEYS.

United States Patent Office 3,115,139
Patented Dec. 24, 1963

3,115,139
TEETHING DEVICE
John R. Schneider, 286 Tilbrook Drive, Pitcairn, Pa.
Filed Apr. 11, 1962, Ser. No. 187,153
7 Claims. (Cl. 128—359)

This invention relates to teething devices and more particularly to a vibratory teething device with vibration frequencies established by a battery operated electric motor.

This invention is especially useful as an aid in the cutting of teeth of infants in the instance where newly formed and growing teeth must rupture the gums. It is the usual practice to apply pressure against the sharp edges of a new tooth by pressing the gum area covering the tooth with a blunt instrument such as a wooden stick or with a finger. In this manner the sharp edged new tooth pierces the gum covering, and the tooth then continues to grow into its position within the natural order of teeth arrangement. Massages of the sensitive gum areas over the edges of the new teeth is accomplished in other fashions, such as the use of teething rings and rubber objects to be chewed upon by the infant. To lessen the pain during the period of teething, medicaments are often applied to the gums, either with or without gum massages. However, whether the new teeth are forced through the gums by rupturing the gums with an instrument or whether they cut their way through the gums slowly, assisted by gum massages, the ordeal is disconcerting and painful to the infant.

It is an object of the present invention to provide a teething device which aids in the piercing of new teeth through the gums.

Another object is the provision of a teething device which, when gripped by closing of gums or teeth, or both, on a portion thereof, imparts a vibration to the gums to distract an infant from the pain of new teeth cutting through his gums.

A further object is to provide a teething device which can be handled by a small child whereby a portion may be self-inserted into his mouth and gripped whereupon vibrations are instigated and the gums massaged thereby.

Still another object of the present invention is the provision of a teething device which simulates the appearance of a nursing bottle and which includes vibration producing mechanism for causing the simulated bottle nipple to vibrate rapidly when compressed.

Other objects and many attendant advantages will become readily apparent from the following detailed description of specific embodiments thereof when read in conjunction with the appended drawings wherein.

Figure 1:
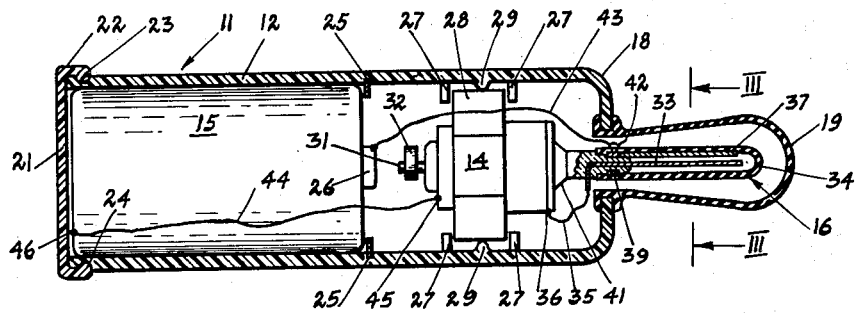
FIG. 1 is a longitudinal cross-sectional view of the device.

Referring to the drawings, where like reference characters designate like or corresponding parts throughout the views, there is shown in FIG. 1 a teething device designated generally by numeral 11. The device is comprised essentially of a casing 12 which houses a fractional horse power motor 14 energized by a battery 15, and a probe 16 which extends beyond the casing through an aperture 17 in the wall 18 of the casing. A nipple 19 of conventional shape and material, which is not per se claimed as the invention, has its open end fitted into the edges of the wall 18 forming the aperture 17 and surrounds the probe 16 in its entirety for that portion of its length protruding from the casing.

The bottom of the casing 12 is open and is provided with a closure 21 which, in the preferred embodiment of FIG. 1, is snapped into position by intimate contact of a peripheral flange 22 having an inwardly directed bead 23 with a circumferential groove 24 formed in the outer surface of the casing 12.

A retaining ring 25 is removably located on the inner surface of the casing 12 and is spaced from the bottom of the casing an axial distance sufficient to receive between the retaining ring and the casing bottom a conventional size battery 15.

In advance of the battery positive post 26 within the casing there is situated the motor 14 which is held in place within the casing by means of spaced protuberances 27 attached to the casing inner wall surface in frictional bearing contact with the motor housing 28. Motor mounts 29 are arranged on the inner wall surface of the casing 12 at radial points and press against the motor housing 28 to lock it in place. The protuberances 27 are removable, for example, for assembly of the motor 14 within the teething device casing 12. The motor mount material may be resilient to a degree sufficient to isolate the vibration of the motor 14 from the casing 12.

The motor 14 has a shaft 31 to which is suitably keyed an eccentric weight 32 which rotates simultaneously with the rotation of the shaft 31. Rotation of the weight 32 imparts the forces of vibration to the motor and to the probe 16 which is firmly connected to the motor housing 28 with its longitudinal axis coincident with the longitudinal axis of the motor 14, both axes passing through the center of the aperture 17 in the wall 18 of the casing 12. By this arrangement the vibration of the motor 14 induced by the rotated weight 32 is transmitted to the probe 16.

Figure 3:
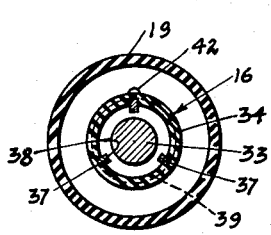
FIG. 3 is a cross-section of the device taken on line III—III of FIG. 1, but in full rather than half section.

Referring to FIG. 3 the material of the probe 16 is compressible by pressure occasioned when the nipple 19 is gripped within the mouth and brought to bear against the probe 16 by collapse of the walls of the nipple. The probe 16 is hollow with a metallic rod 33 passed through the center thereof and surrounded by the wall 34 of the probe. The metallic rod 33 is connected by a lead 35 to one terminal 36 of the motor winding, not shown. A plurality of contact strips 37, which may be wires, bars, or the like, for example, are depicted in FIG. 3 as embedded partially within the inner surface of the probe wall 34. The exposed surfaces 38 of the contact strips 37 are brought into electrical contact with the metallic rod 33 when the wall 34 of the probe is flexed radially toward the probe center line by gripping action of the gums or teeth at opposed points on the nipple 19 and thence at opposed points on the probe wall 34. The strips 37 are electrically connected by a metallic buss ring 39 which is also embedded into the inner surface of the probe wall 34 in contact with each of the strips 35. The end of the probe 16 adjacent the motor 14 is fixed by suitable sealing means to a socket 41 of insulating material which is in turn fastened to the motor housing 28 rigidly by fasteners or adhesives, not shown.

The buss ring 39 is connected to a terminal 42 on the exterior surface of the probe wall 34 to which is attached, as by soldering, a wire lead 43. The wire lead is fastened to the positive post 26 of the battery 15. Another lead 44 is connected to the other terminal 45 of the motor winding, not shown, and to the negative post of the battery as indicated by numeral 46.

The electrical circuit of the device 11 is completed from the positive post 26 of the battery 15, the lead 43 to the terminal 42 of the probe 16, the buss ring 39, the strips 37, rod 33 when the strips are pressed thereagainst as explained hereinbefore, lead 35 to terminal 36 of the motor winding, through the winding to terminal 45 and lead 44, and finally to the negative post 46 of the battery 15. The rod 33 and strips 37 of the probe 16 accordingly serve as normally open contacts of a switch which is closed by pressure of the gums and/or teeth against the nipple 19 and the probe 16.

Figure 2:
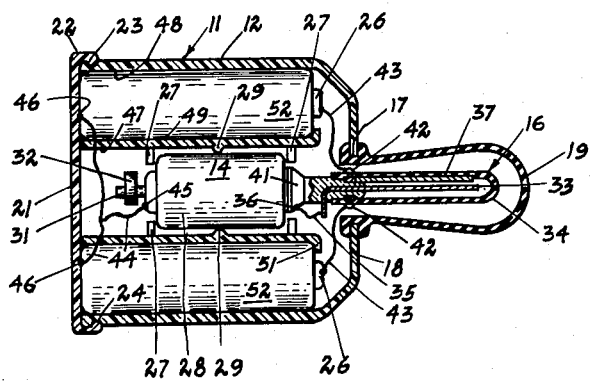
FIG. 2 is a cross-section of a second embodiment of the invention.

In FIG. 2 of the drawings a second embodiment of the teeth device 11 is shown to include a casing 12 which is circular in cross-section, and which is partitioned into concentric ring areas 47 and 48 by a tubular wall 49 which is fixed to the bottom closure 21 of the casing 12. The tubular wall 49 has a radially directed flange 51 which functions as a stop member for batteries 52 disposed in the ring area 48 of the casing 12 about the centrally positioned motor 14 in ring area 47. Protuberances 27 are removably engaged to the tubular wall 49 between which is fitted the motor 14, and a plurality of motor mounts 29 are arranged between the spaced protuberances in friction contact with the motor housing 28 to fix it in place. Similar in action to the weight 32 and the motor 14 of FIG. 1, the eccentric weight 32 in FIG. 2 imparts a vibratory motion to the motor, and this motion is transmitted to the probe 16 through the socket 41.

The electrical circuit of the embodiment of the invention shown in FIG. 2 is completed from the positive posts 26 of batteries 51, terminals 42 of the probe 16, the buss ring 39, strips 37, the rod 33 when contacted by strips 35, terminal 36 of the motor winding, through the winding to terminal 45, and finally through lead 44 to the negative posts 46 of the batteries 52. The batteries 52 are miniature in size, for example, standard size AA, and are connected in parallel for attaining suitable amperage for operation of the motor 14.

The teething device is compact and electrically shockproof by reason of all operating parts and electrical connections being completely enclosed by the casing 12 of an insulating plastic material and by the nipple 19 which is natural rubber, synthetic rubber, or plastic, all of which are chosen as non-conductors of electricity. As an added safeguard against electrical shock, the probe 16 formed by the wall 34 is of an insulating resilient material with all connections to the metallic rod 33 within the probe 16 being positioned within the casing wall 18 out of touch by an infant.

It is manifest that numerous modifications of the invention may be made in view of the description of the embodiments disclosed hereinbefore without departing from the spirit and scope of the present invention. For example, it may be appreciated that the particular probe switching arrangement above-described is only an example of one type of pressure-actuated switch which may be operated upon in practicing the invention, and that the invention is not limited to use with this one type of switching arrangement.

What is claimed is:

1. A teething device comprising a compressible probe for insertion into the mouth of a user, exciter means, and means connected to the exciter means and to the probe for exciting the probe to vibratory motion responsive to reduction of the cross sectional area of the probe.

2. A teething device comprising a casing of a shape corresponding to the configuration of a feeding bottle, a nipple connected to the casing, a compressible probe positioned within the nipple and extending into the casing, and means contained within the casing and attached to the probe for imparting vibratory motion to the probe responsive to compression of the probe by collapse of the nipple thereagainst whereby the cross-section of the probe is reduced.

3. A teething device comprising a casing, a motor positioned within the housing for producing vibratory motion, an electrical power source within the casing for driving the motor, a resilient compressible probe fixed to the motor for vibration therewith and extending beyond the casing for insertion into the mouth of a user of the device, a pressure responsive switch within the probe, and an electrical circuit including the motor, the power source and the switch whereupon the motor is energized when the circuit is completed by closing of the switch responsive to pressure on the probe which compresses the cross-section of the probe, and the motor is deenergized when the circuit is opened by the opening of the switch responsive to the absence of pressure on the probe.

4. A teething device as in claim 3 wherein the probe is enclosed by a nipple connected to the casing which is collapsible upon application of force of gums and teeth thereagainst whereby the probe is also compressed.

5. A teething device comprising a casing of a shape corresponding to the configuration of a nursing bottle, the casing being open at one end and provided with an aperture at the other end, a closure removably connected to the one end, a motor having a winding and mounted within the casing of an electrical power source positioned within the casing for driving the motor, an eccentric weight connected to the motor and rotated thereby to impart vibratory motion to the motor, a nipple removably connected at its open end to the casing with the end surrounding the aperture, a hollow probe fixed to the motor within the casing and extending through the casing aperture beyond the casing into the nipple, a metallic rod extending in the hollow of the probe and spaced from the walls thereof, the rod being fastened to the motor and electrically insulated therefrom, a metallic strip partially embedded in the inner surface of the walls of the hollow probe and extending from the casing in the same direction as the rod but spaced therefrom throughout its length, a first electrical lead connected to the strip and to the power source, a second electrical lead connected to the rod and to one terminal of the motor winding, and a third electrical lead connected to the other terminal of the winding end to the power source, the rod and the strip forming a normally open switch responsive to pressure whereby the strip contacts the rod to energize the motor.

6. A teething device as in claim 5 wherein the closure, casing, probe, and nipple are of electrical insulating material.

7. A teeth device as in claim 5 wherein the casing is divided into concentric ring areas in cross-section by a tubular wall fastened at one end to the closure with the motor being mounted within the innermost ring area and with power sources in the outermost ring area and surrounding the motor.

References Cited in the file of this patent

UNITED STATES PATENTS

| | | |
|---|---|---|
| 2,227,276 | Salit | Dec. 31, 1940 |
| 2,319,205 | Buck | May 18, 1943 |
| 2,675,800 | Voorhees et al. | Apr. 20, 1954 |
| 2,696,382 | Gelardin | Dec. 7, 1954 |